United States Patent
Carbonnel et al.

[15] 3,666,295
[45] May 30, 1972

[54] CONDUITS FOR LIQUID METALS

[72] Inventors: Henri Carbonnel, Antony; Pierre Descleve, Bures-sur-Yvette, both of France

[73] Assignee: Groupement Atomique Alsacienne Atlantique (G.A.A.A.), Le Pleissis-Robinson, France

[22] Filed: Dec. 10, 1970

[21] Appl. No.: 96,827

[30] Foreign Application Priority Data

Dec. 10, 1969 France..................................6942788
Dec. 29, 1969 France..................................6945218

[52] U.S. Cl..................................285/41, 277/22, 285/226, 285/230, 285/423, 285/DIG. 11
[51] Int. Cl.........................................................F16l 53/00
[58] Field of Search..................285/41, 45, 47, 226, DIG. 11, 285/336, 423, 230; 277/22

[56] References Cited

UNITED STATES PATENTS

| | | | |
|---|---|---|---|
| 2,383,089 | 8/1945 | Theiler | 285/336 X |
| 2,479,612 | 8/1949 | Glidden | 285/336 X |
| 2,615,473 | 10/1952 | Hamer | 285/336 X |
| 2,504,634 | 4/1950 | Boschi | 285/336 X |
| 2,840,350 | 6/1958 | Pierce | 285/41 |
| 3,189,371 | 6/1965 | Swan | 285/336 X |
| 3,332,710 | 7/1967 | Doty | 285/336 |

FOREIGN PATENTS OR APPLICATIONS

| | | | |
|---|---|---|---|
| 1,249,700 | 11/1960 | France | 285/336 |
| 6,401,329 | 9/1964 | Netherlands | 285/336 |

*Primary Examiner*—David J. Williamowsky
*Assistant Examiner*—Wayne L. Shedd
*Attorney*—Sughrue, Rothwell, Mion, Zinn & Macpeak

[57] ABSTRACT

An improved seal for connecting liquid metal conduit sections. It comprises at least two rings made of fire-proof fibers, squeezed between the adjacent sections, with sealing means being provided between the rings in order to prevent leakage and cause the hardening or freezing of liquid metal which tends to seep between the two rings on the one hand, or between the rings and the adjacent conduit sections on the other hand. The invention can be used for very corrosive metals such as zinc and aluminum.

11 Claims, 6 Drawing Figures

CONDUITS FOR LIQUID METALS

BACKGROUND OF THE INVENTION

The present invention concerns conduits for liquid metals, and is more particularly concerned with an improved joint for a conduit comprising a series of conduit sections arranged end-to-end to form the conduit. Each pair of adjacent conduit sections is separated by a joint.

Liquid metals generally have a number of properties making normal metals unsuitable for the fabrication of conduits. It has already been proposed to use conduits of a refractory material for transporting liquid metals. Such conduits generally consist of a series of sections joined end-to-end, the fluid-tightness of the conduit being assured by gaskets disposed between transverse flanges at the section ends. It has been proposed to fabricate these gaskets from ceramic fibers, of silica or alumina for example.

Such conduits suffer from a number of disadvantages. In particular, it has been found difficult to provide sufficiently tight clamping of the gaskets between conduit sections because of the mechanical properties of the refractory materials used. Also, the clamping may not be uniform around the conduit periphery because of irregularities in the mating surfaces. There may result an inadequate fluid-tightness, leading to leaking of the liquid metal. Such leakage may bring about considerable damage, particularly when the metal concerned is highly corrosive, for example.

SUMMARY OF THE INVENTION

In accordance with the invention, a conduit for liquid metals comprises a series of conduit sections arranged end-to-end along a conduit axis. Each pair of adjacent conduit sections is separated by a joint including a pair of frames of refractory fibers sandwiched between the opposed conduit section end faces; and an arrangement providing a seal between the frames is adapted to encourage rapid freezing of any liquid metal leaking between the frames or between either frame and the adjacent conduit section.

BRIEF DESCRIPTION OF THE DRAWINGS

The invention will now be described in more detail, by way of examples only, with reference to the accompanying diagrammatic drawings in which.

DESCRIPTION OF THE PREFERRED EMBODIMENTS

Figure 1:
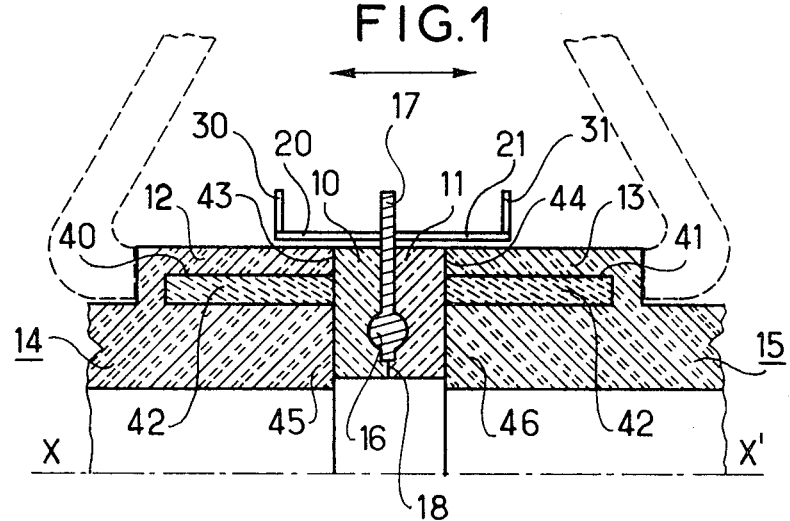
FIG. 1 is a partial section of a first form of conduit.

In all the Figures, there is shown in section that portion of a conduit above the conduit axis X—X' on either side of a joint between adjacent conduit sections. In all the Figures, elements which are identical or perform analogous functions carry the same reference numerals.

Referring first to FIG. 1, a conduit for liquid metals comprises a series of conduit sections arranged end-to-end along a conduit axis X—X'. End portions of a pair of adjacent conduit sections 14 and 15 are shown in FIG. 1. The conduit sections are formed on a material presenting a great affinity for oxygen, preferably graphite. The conduit section end portions are formed with respective flanges 12 and 13. In the conduit, each pair of adjacent sections is separated by a joint, each such joint comprising a pair of frames 10 and 11 with a gasket 17 sandwiched between them.

Such conduits are generally circular in cross section, in which case the frames 10 and 11 are in the form of circular rings. It will be appreciated, however, that where the conduit is not circular in cross section, the frames 10 and 11 will have an outline corresponding to that of the conduit cross-section. Evidently, the form of the gasket 17 corresponds to that of the frames 10 and 11. In the remainder of this description, it will be assumed that a conduit of circular cross-section is being discussed.

The rings 10 and 11 are formed from fibers of a refractory material, a ceramic material for example, since in the finished conduit the conduit sections are clamped tightly together to compress the rings 10 and 11 which would tend to shatter if formed of a solid refractory material. The compression of the rings made from ceramic fibers produces local rearrangements of the fiber structure so that the clamping force is absorbed without damage to the rings.

The gasket 17 is formed of a metal having a high thermal conductivity. It consists of an annular member having an extension projecting beyond the outer periphery of the conduit sections to provide a cooling vane, and has, in an inner region, a part-circular rim on each face, the two rims together providing a sealing strip 16 of circular cross-section running around the conduit axis X—X' and forming complementary grooves of semi-circular cross section in the opposed faces of the rings 10 and 11.

In each joint, the cooling vane provided by that part of the gasket 17 projecting beyond the outer periphery of the conduit sections is coupled to a cooling device external to the conduit. In FIG. 1, this external cooling device consists of a pair of cooling sleeves 20 and 21, each linked firmly to one face of the cooling vane. The cooling sleeve 20 surrounds the ring 10 and an end portion of the conduit section 14. Likewise, the sleeve 21 surrounds ring 11 and an end portion of conduit section 15. Around their edges opposite to those attached to the cooling vane, the sleeves 20, 21 carry respective cooling fins 30, 31 in the form of annular flanges welded or otherwise attached to the respective sleeves.

Figure 2:
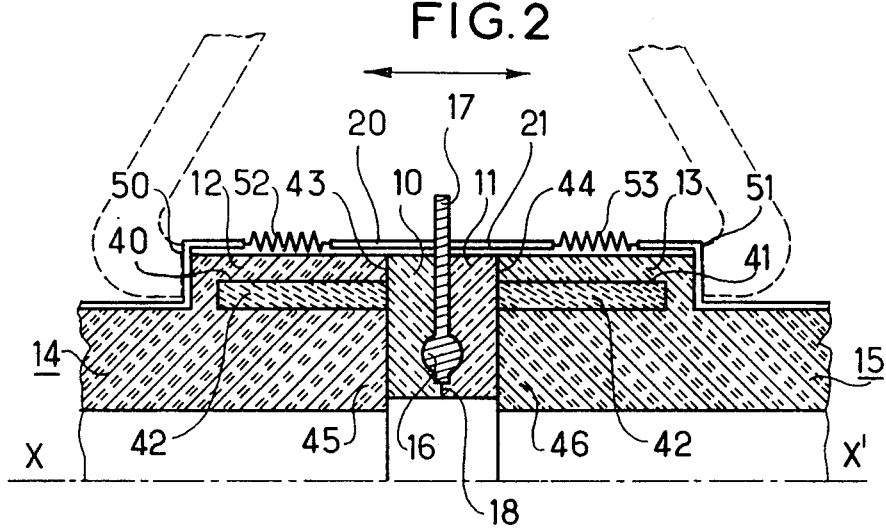
FIG. 2 is a similar section of a modified version of the conduit shown in FIG. 1.

In the opposed end faces of the conduit sections 14 and 15 are formed respective annular grooves 40 and 41. These grooves run around the conduit periphery and extend away from the respective end face in a direction substantially parallel to the conduit axis. Each groove is filled with a thermally insulative material 42, preferably in the form of fibers of a refractory material. The grooves 40 and 41 have the same internal and external diameters, so that the two annular deposits of thermally insulative material 42 are aligned, as shown in FIGS. 1 and 2.

The internal and external diameters of each groove 40, 41, together with their depths parallel to the conduit axis X—X' are so chosen that the temperature of the outer portions 43 and 44 of the flanges 12 and 13 remains much lower than the temperature of the liquid metal carried by the conduit. Evidently, the temperature of the inner regions 45 and 46 of the flanges 12 and 13 is close to that of the liquid metal.

When the conduit sections are clamped together, the gasket 17 is pressed tightly between rings 10 and 11, the sealing ring 16 locally deforming the rings 10, 11. If any metal leaks between the ring 16 and one of the rings 10, 11, it is rapidly and progressively cooled by virtue of the cooling vane, the sleeves 10 and 11, and the cooling fins 30 and 31. The metal thus is rapidly frozen so that further leakage cannot take place. Likewise, any liquid metal leaking between either of the rings 10, 11 and the corresponding conduit section is progressively cooled as it travels towards the outside of the conduit, thereby freezing in the space between the ring and the conduit to prevent further leakage.

The local cooling of the conduit surface produced by the gasket 17 and the cooling arrangement attached to it reduces the amount of oxidation of the conduit, so leading to an increased life.

Referring now to FIG. 2, in a modified joint the arrangement of the rings 10 and 11 and the gasket 17 is as shown in FIG. 1. Sleeves 20, 21 are provided, but without the cooling fins 30, 31. Thermally insulative material 42 is provided, again as in FIg. 1.

The conduit of FIG. 2 is provided with an arrangement for protecting it against oxidation. This consists of a respective sheath surrounding a central portion of each conduit section.

The sheaths for sections 14 and 15 are referenced 50 and 51, respectively. The sheaths 50, 51 are formed of a metal resistant to corrosion, such as nickel or stainless steel, for example. The external cooling device, in the form of the sleeves 20, 21 is elastically attached in sealed fashion to this protective arrangement. An elastic bellows 52 joins the edge of the sleeve 20 remote from the gasket 17 and an edge of the sheath 50. An identical bellows 53 links the cooling sleeve 21 to the sheath 51. These bellows serve to elastically accomodate variations in the lengths of the sleeves and sheaths, particularly due to changes in temperatures.

The internal faces of the sheaths, the bellows and the cooling sleeves may advantageously be coated with a material for protecting them against any liquid metal which may come into contact with them. This material may, for example, be boron nitride.

The modified conduit of FIG. 2 is better protected against oxidation.

Figure 3:
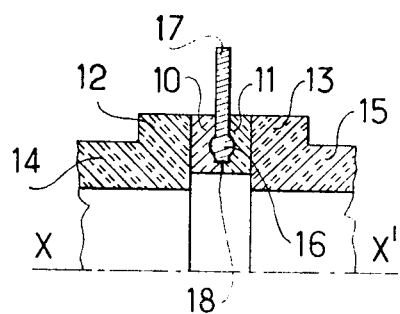
FIG. 3 is a second form of conduit.

Referring now to FIG. 3, the arrangement is much the same as in FIG. 1, with the exception that the conduit sections are formed of a refractory material presenting a low thermal conductivity. Also, the annular grooves, indicated at 40, 41 in FIGS. 1 and 2 and containing the thermally insulative material 42, are not present. The gasket 16 is not connected to any external cooling device.

In the arrangement of FIG. 3, the sealing is obtained in precisely analogous manner to that of FIGS. 1 and 2. Any liquid metal leaking between the rings 10, 11 or between either ring and the adjacent conduit section, is progressively cooled and freezes to prevent further leakage.

Figure 4:
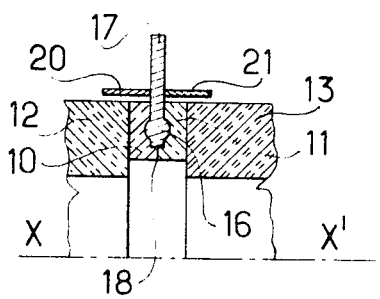
FIGS. 4 to 6 show three modifications to the conduit of FIG. 3.

Referring to FIG. 4, a pair of cooling sleeves 20, 21 is attached to the gasket 17 to accelerate the cooling of any liquid metal escaping between the rings 10, 11 or between either ring and the adjacent conduit section.

Figure 5:
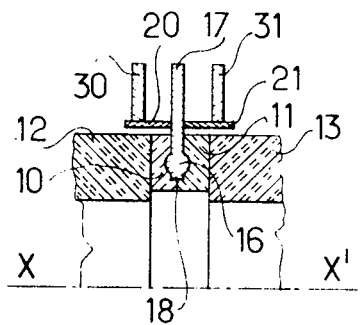

Referring to FIG. 5, each of the cooling rings 20, 21 may carry a cooling fin 30, 31 respectively, in the form of an annular flange. A further acceleration of the cooling is thus obtained.

Figure 6:
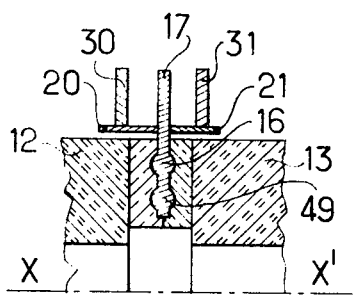

Referring to FIG. 6, the flange 17 may be provided with a second cooling strip 49 inside, spaced from and parallel to strip 16. The two strips are identical, and with this arrangement should the inner strip fail for any reason, the outer strip will continue to provide an effective seal.

The conduits of FIGS. 4 to 6 may be formed of any suitable refractory material, the thermal conductivity of the material being of reduced importance because of the accelerated cooling provided by the external cooling device.

In any of the conduits just described, the gasket 17, and more particularly the sealing strip 16 or 49 thereof, may be coated with an anti-corrosion material, such as boron nitride, for example.

In all the conduits, the gasket 17 does not extend entirely to the inside surface of the rings 10, 11 which are in contact along a line 18 inwardly of the gasket.

In all the conduits, the surface areas of the rings 10 and 11 in contact with the end faces of the respective conduit sections are substantially the same as the areas of those end faces.

The invention provides a liquid metal conduit suitable for use with highly corrosive metals such as zinc or aluminum.

The conduit structures just described have certain advantages. More particularly, the local deformation of the rings 10, 11 produced by the sealing strip 16 of the gasket 17 provides an effective local seal.

The use of the cooling vane producing selective cooling across the conduit walls permits both rapid freezing of any liquid metal leaking between the rings or between the ring and the adjacent conduit section, and at the same time can reduce the effect of oxidation on the outer surface of the conduit. The circular cross section of the sealing strip 16 increases the path any leaking liquid metal has to traverse to reach the outside of the conduit, so increasing the time during which it is cooled to reduce the likelihood of any liquid metal reaching the outside of the conduit. The conduit structures are simple, leading to easy assembly and, where necessary, easy replacement of the component parts.

What is claimed is:

1. A conduit for liquid metals, comprising a series of conduit sections arranged end-to-end along a conduit axis; each pair of adjacent conduit sections being separated by a joint including a pair of rings of refractory fibers sandwiched between the opposed conduit section end faces; and sealing means disposed between the rings for encouraging rapid freezing of any liquid metal leaking between the rings or between either ring and the adjacent conduit section; and clamping means holding the opposed conduit ends in operable relation.

2. A conduit as claimed in claim 1, wherein the face of each ring facing the end face of the adjacent conduit section has substantially the same area as the end face.

3. A conduit as claimed in claim 1, wherein said sealing means includes a metal gasket between the rings, said gasket having an extension projecting beyond the outer periphery of the adjacent conduit sections to provide a cooling vane.

4. A conduit as claimed in claim 1, wherein the opposed end faces of each pair of adjacent conduit sections have respective grooves running around the conduit periphery and extending away from the respective end face substantially parallel to the conduit axis, each groove containing a thermally insulative material.

5. A conduit as claimed in claim 3, wherein the cooling vane is coupled to a cooling device external to the conduit.

6. A conduit as claimed in claim 5, wherein each external cooling device comprises a pair of cooling sleeves each linked thermally to one face of the respective cooling vane and surrounding the frame and an end portion of the conduit section on the same side of the vane as the sleeve.

7. A conduit as claimed in claim 6, wherein each cooling sleeve carries at least one cooling fin.

8. A conduit as claimed in claim 5, wherein means are provided for protecting the conduit against oxidation, and the external cooling device is attached elastically and in sealed fashion to said oxidation protecting means.

9. A conduit as claimed in claim 8, wherein said means for protecting the conduit against oxidation comprises a respective sheath surrounding a central portion of each conduit section, a pair of cooling sleeves are linked thermally to said cooling vane, and respective ends of each sheath are connected to the adjacent cooling sleeve by an elastic bellows sealing the sheath to the sleeve.

10. A conduit as claimed in claim 3, wherein each gasket includes a sealing strip of circular cross-section.

11. A conduit as claimed in claim 10, wherein the sealing strip is one of a pair of parallel spaced strips.

* * * * *